US008898509B2

(12) United States Patent
Mummidi

(10) Patent No.: US 8,898,509 B2
(45) Date of Patent: *Nov. 25, 2014

(54) POLICY-BASED CHECKPOINTING FAULT TOLERANCE ACROSS REMOTE VIRTUAL MACHINES

(71) Applicant: VMware, Inc., Palo Alto, CA (US)

(72) Inventor: Raviprasad Mummidi, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/712,693

(22) Filed: Dec. 12, 2012

(65) Prior Publication Data

US 2013/0097120 A1   Apr. 18, 2013

Related U.S. Application Data

(63) Continuation-in-part of application No. 13/450,249, filed on Apr. 18, 2012, which is a continuation-in-part of application No. 12/781,875, filed on May 18, 2010, now Pat. No. 8,171,338.

(51) Int. Cl.
*G06F 11/00* (2006.01)
*G06F 17/30* (2006.01)
*G06F 11/20* (2006.01)

(52) U.S. Cl.
CPC .... *G06F 17/30289* (2013.01); *G06F 2201/815* (2013.01); *G06F 11/2046* (2013.01); *G06F 11/2097* (2013.01); *G06F 11/2038* (2013.01)
USPC ........................................................ 714/4.11

(58) Field of Classification Search
CPC ............ G06F 11/2097; G06F 11/2043; G06F 11/2041; G06F 11/2038; G06F 11/2046
See application file for complete search history.

(56) References Cited

U.S. PATENT DOCUMENTS

| 6,073,222 A | 6/2000 | Ohran |
| 7,103,797 B1 | 9/2006 | Wahl et al. |
| 7,203,732 B2 * | 4/2007 | McCabe et al. ................ 709/217 |

(Continued)

FOREIGN PATENT DOCUMENTS

| EP | 0097256 | 1/1984 |
| WO | 0195093 | 12/2001 |
| WO | 2011146645 | 11/2011 |

OTHER PUBLICATIONS

International Search Report and Written Opinion of the International Searching Authority, International Patent Application No. PCT/US2011/037032, European Patent Office, Oct. 21, 2011, 10 pages.

(Continued)

*Primary Examiner* — Christopher McCarthy

(57) ABSTRACT

Embodiments include a checkpointing fault tolerance network architecture enables a first computer system to be remotely located from a second computer system. An intermediary computer system is situated between the first computer system and the second computer system to manage the transmission of checkpoint information from the first computer system to the second computer system in an efficient manner. The intermediary computer system responds to requests from the second computer system for updated data corresponding to memory pages selected by the second computer system, or memory pages identified through application of policy information defined by the second computer system.

20 Claims, 8 Drawing Sheets

(56) References Cited

U.S. PATENT DOCUMENTS

| | | | |
|---|---|---|---|
| 7,296,125 B2 | 11/2007 | Ohran | |
| 7,398,366 B2 | 7/2008 | Ohran | |
| 7,484,208 B1* | 1/2009 | Nelson | 718/1 |
| 7,779,295 B1* | 8/2010 | Shah et al. | 714/6.32 |
| 7,900,006 B2 | 3/2011 | Nagaraj | |
| 8,099,627 B1* | 1/2012 | Shah et al. | 714/16 |
| 8,171,338 B2 | 5/2012 | Agesen et al. | |
| 8,554,900 B2* | 10/2013 | Nelson | 709/223 |
| 2005/0132250 A1* | 6/2005 | Hansen et al. | 714/5 |
| 2007/0168518 A1 | 7/2007 | McCabe et al. | |
| 2009/0217085 A1 | 8/2009 | Van Riel et al. | |
| 2012/0204061 A1 | 8/2012 | Mummidi | |
| 2013/0067277 A1 | 3/2013 | Mummidi | |
| 2013/0246355 A1* | 9/2013 | Nelson et al. | 707/625 |

OTHER PUBLICATIONS

"Non-final Office Action in U.S. Appl. No. 13/670,319", Mailed Date: Dec. 17, 2013, 13 Pages.

"Non-final Office Action in U.S. Appl. No. 13/450,249", Mailed Date: Dec. 17, 2013, 12 Pages.

"Non-final Office Action in U.S. Appl. No. 12/781,875", Mailed Date: Jul. 6, 2011, 5 Pages.

"Notice of Allowance in U.S. Appl. No. 12/781,875", Mailed Date: Dec. 30, 2011, 5 Pages.

"Final Office Action in U.S. Appl. No. 13/670,319", Mailed Date: May 2, 2014, 9 Pages.

"Final Office Action in U.S. Appl. No. 13/450,249", Mailed Date: Apr. 25, 2014, 8 Pages.

* cited by examiner

POLICY-BASED CHECKPOINTING FAULT TOLERANCE ACROSS REMOTE VIRTUAL MACHINES

CROSS-REFERENCE TO RELATION APPLICATIONS

This application is a continuation-in-part application of U.S. patent application Ser. No. 13/450,249 filed Apr. 18, 2012, which is a continuation-in-part application of U.S. Pat. No. 8,171,338, issued May 1, 2012, both of which are entitled "Method and System for Enabling Checkpointing Fault Tolerance Across Remote Virtual Machines." The entirety of both applications is hereby incorporated by reference herein.

BACKGROUND

As large-scale enterprises continue to adopt virtualization platforms as the foundation of their data centers, virtual machine (VM) fault tolerance has become an increasingly important feature to be provided by virtualization platform providers. Because a single host server in a virtualized data center can support multiple VMs, failure of that host server can bring down a multitude of services that were provided by the different VMs running on the failed host server. As such, virtualization platforms need to provide a mechanism to quickly resurrect a failed VM on a different host server so that the enterprise can maintain the quality of its service.

Currently, providing fault tolerance for a primary VM is typically achieved by providing a backup VM that runs on a server residing in a different "fault domain" from the server of the primary virtual machine. A fault domain can generally be described as a set of host servers in a data center (or data centers) that share a number of specified attributes and/or characteristics that results in a higher probability of failure of host servers in the fault domain upon a failure of one of the host servers in the fault domain. The attributes and/or characteristics utilized by an enterprise to define its data center fault domains depend upon the type of disasters and the level of recovery that the enterprises desire to achieve. For example, an enterprise may choose to define its fault domains based upon the physical proximity of host servers (storage rack location, geographic locations, etc.), the dependency of such servers on shared hardware (networked storage, power sources, physical connections, etc.) or software technologies (shared file systems, etc.), and the like. A well-constructed fault domain minimizes the correlation of a failure of a VM in one fault domain with the failure of another VM in a different fault domain.

VM fault tolerance may be provided using deterministic replay, checkpointing, or a hybrid of the two, which is disclosed in U.S. patent application Ser. No. 12/259,762, filed on Aug. 28, 2008, the entire contents of which are incorporated by reference herein. With replay techniques, essential portions of a primary VM's instruction stream (e.g., non-deterministic events within the primary VM's instruction stream) are captured in real-time (e.g., by a hypervisor layer or virtual machine monitor component of the primary VM) and transmitted to a backup VM (e.g., presumably located in a different fault domain) to "replay" the primary VM's execution in a synchronized fashion. If the primary VM fails, the backup VM can then take over without discernible loss of time. While replay techniques provide a robust fault tolerance solution with fast recovery times, they are less viable, for example, when non-deterministic events become more frequent or more difficult to identify within instruction streams, as is the case with virtual machines that support SMP (symmetric multiprocessing) architectures with multiple virtual CPUs.

In contrast to replay techniques, checkpointing based fault tolerance techniques are more flexible in their capabilities to support a variety of virtual architectures, including SMP-based virtual machines. Techniques for generating and using checkpoints in a virtual computer system are disclosed in U.S. Pat. No. 7,529,897, the entire contents of which are incorporated by reference herein. With checkpointing, the primary VM is periodically stunned (i.e., execution is temporarily halted) during the course of execution (each such stun period referred to as a "checkpoint") to determine any modifications made to the state of the primary VM since a prior checkpoint. Once such modifications are determined, they are transmitted to the backup VM which is then able to merge the modifications into its current state, thereby reflecting an accurate state of the primary VM at the time of the checkpoint. Only upon notification of a failure of the primary VM does the backup VM begin running, by loading the stored state of the primary VM into its own execution state. However, due to the potentially large size of checkpoint information (e.g., multiple gigabytes) in a transmitted state and the need to stun the primary VM at periodic checkpoints to transmit such state to the backup VM, the backup VM must be networked to the primary VM with sufficiently high bandwidth such that the stun period is not prolonged by network bandwidth limitations. This constraint currently restricts the ability to locate backup VMs in locations that are geographically distant from the primary VM or otherwise in a manner in which backup VMs are connected to primary VMs using network connections having insufficient bandwidth capacity to effectively transmit checkpoint information.

SUMMARY

One or more embodiments of the present invention enable a backup VM that receives checkpointing information to be remotely located from a primary VM. Such embodiments situate an intermediary computer system between the primary VM and the backup VM to manage the transmission of checkpoint information to the backup VM in an efficient manner. In some embodiments, the intermediary computer system is networked to the primary VM through a high bandwidth connection but is networked to the backup VM through a lower bandwidth connection. During each checkpoint, the intermediary computer system receives and stores updated data from the primary VM that corresponds to memory pages in the state of the primary VM that have been modified since a previous checkpoint.

One or more embodiments described herein transmit an updated state of a first computer system to a second computer system through an intermediary computer system. The intermediary computer system receives checkpoint information packets from the first computer system. Each checkpoint information packet includes updated data corresponding to one or more memory pages of the first computer system that have been modified since a previously received checkpoint information packet. The intermediary computer system provides the second computer system with data describing the memory pages and receives, from the second computer system, a request for a copy of at least one of the memory pages. The intermediary computer system transmits the requested copy of the memory pages to the second computing device.

Alternatively or in addition, the second computer system defines policy information describing one or more of the memory pages to select. The intermediary computing system applies the defined policy information to select the memory pages and transmits to the second computing system the selected memory pages.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Embodiments described herein provide updated state of a first computer system 802 to a second computer system 806 via an intermediary computer system 115 to provide fault tolerance for first computer system 802. In some embodiments, the updated state corresponds to checkpoint information packets including data describing memory pages of a plurality of virtual machines (VMs) executing on first computer system 802.

In some aspects, intermediary computer system 115 pushes the memory pages to second computer system 806. In other aspects, second computer system 806 pulls the memory pages from intermediary computer system 115 by selectively requesting particular memory pages. For example, as described below with reference to FIG. 6 and FIG. 6, intermediary computer system 115 responds to requests from second computer system 806 for updated data relating to particular memory pages. Second computer system 806 may also develop and send policy information to intermediary computer system 115 that describes the memory pages of interest to the second computing device. The pull embodiments enable, for example, scalability to a plurality of second computer systems 806 as well as better efficiency.

Still other aspects contemplate both push and pull environments. For example, in a push and pull hybrid environment, intermediary computer system 115 pushes some memory pages to second computer system 806 as described with reference to FIG. 2 and FIG. 3 while second computer system 806 also pulls some memory pages from intermediary computer system 115 as described with reference to FIG. 6 and FIG. 7.

Figure 1A:
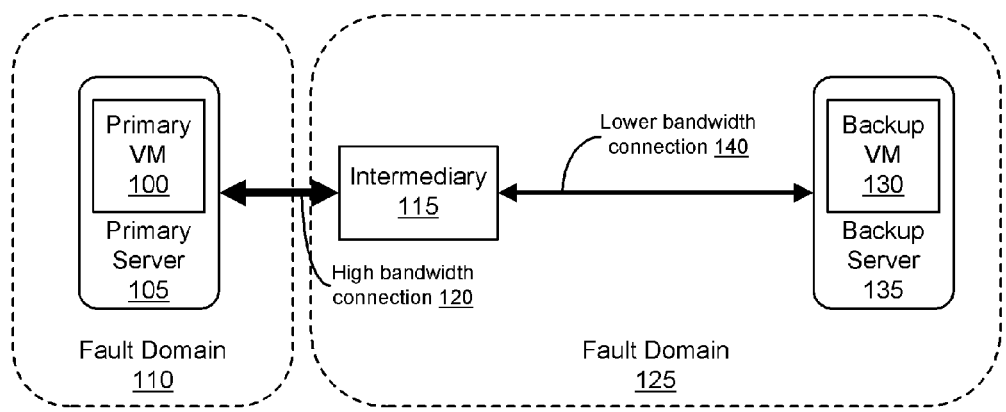
FIG. 1A depicts a block diagram of an embodiment of a network architecture for a primary and backup virtual machine using an intermediary computer system.

FIG. 1A depicts a block diagram of an embodiment of a network architecture for a primary and backup virtual machine using intermediary computer system 115. A primary VM 100 resides on a primary server 105 in a fault domain 110 of a data center. One example of a primary server 105 that supports virtual machines is a server that runs VMware's ESX™ hypervisor product, which is commercially available from VMware, Inc. of Palo Alto, Calif. (although it should be recognized that any virtualization technologies may be used consistent with the teachings herein, including Xen®, Microsoft Hyper-V and the like). An intermediary computer system 115 (hereinafter, "intermediary") is situated in close enough proximity to server 105 such that a high bandwidth connection 120 can be placed between server 105 and intermediary 115. High bandwidth connection 120, as described further below, provides sufficient bandwidth capacity to support the transmission of checkpoint information between primary VM 100 and intermediary 115 during primary VM's 100 execution. For example, in one embodiment, high bandwidth connection 120 provides sufficient bandwidth capacity for intermediary 115 to efficiently receive checkpoint information from the primary VM 100 at a rate of 50 to 100 times per second, with each set of checkpoint information potentially comprising multiple gigabytes of data. Although intermediary 115 is located at a sufficient physical proximity to primary VM 100 to enable high bandwidth connection 120, intermediary 115 is also located in a different fault domain 125 than fault domain 110 of primary VM 100, such that a failure of primary VM 100 (or server 105) is not correlated to (or otherwise does not have a significant correlation to) a failure of intermediary 115. As further depicted in FIG. 1A, a backup VM 130 resides on a backup server 135 that shares fault domain 125 with intermediary 115. A lower bandwidth connection 140 between intermediary 115 and backup VM 130 provides flexibility to situate backup VM 130 in a location geographically remote from intermediary 115 and/or primary VM 100.

In some embodiments, primary server 105 and backup server 135 are referred to as first computer system 802 (or first computing system) and second computer system 806 (or second computing system), respectively.

Figure 1B:
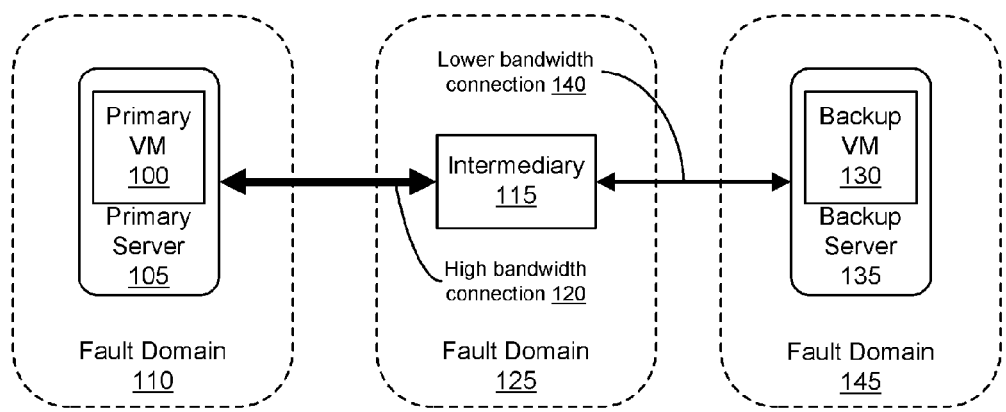
FIG. 1B depicts a block diagram of a second embodiment of a network architecture for a primary and backup virtual machine using an intermediary computer system.

FIG. 1B depicts a block diagram of a second embodiment of a network architecture for a primary and backup virtual machine using intermediary computer system 115. As depicted in FIG. 1B, intermediary 115 and backup VM 130 on backup server 135 reside in different fault domains 125 and 145, respectively. For example, in one embodiment, primary VM 100 resides on blade primary server 105 which also comprises fault domain 110. Intermediary 115 is a second blade server utilizing the same chassis as blade primary server 105 but comprises a different fault domain 125. Intermediary 115 may be placed on top of the chassis, for example, to protect against flood damage that may affect blade primary server 105 which is placed on the bottom of the chassis (e.g., such that blade primary server 105 and the intermediary 115 exhibit different failure characteristics resulting in different fault domains 110 and 125, respectively). High bandwidth connection 120, in such an embodiment, may be facilitated by the PCI-e backplane of the chassis. Backup VM 130 on backup server 135 may be located in geographically remote location in this embodiment. For example, if primary VM 100 and intermediary 115 are located in a data center in Palo Alto, Calif., backup VM 130 may be located in a different data center in Boston, Mass. In another embodiment, intermediary 115 may be located at the edge of a subnet, for example, as a modified NIC or a router or other edge device, for consolidation in management. Alternatively, the functionality of intermediary 115 may be implemented within primary server 105 itself, for example, set in a relatively more reliable part of the processor or motherboard of primary server 105.

Figure 2:
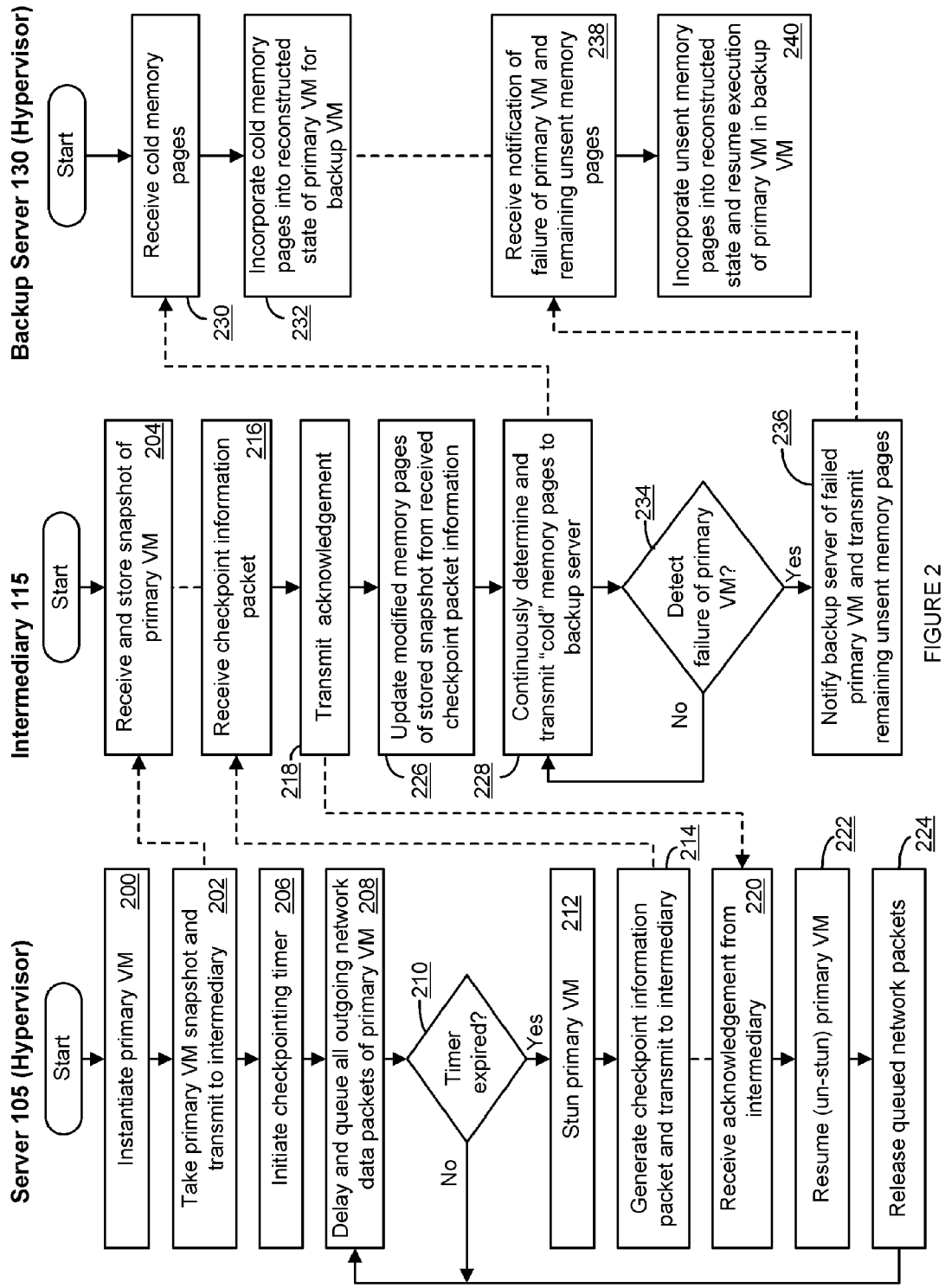
FIG. 2 depicts a flow diagram for transmitting an updated state of a primary virtual machine to a backup virtual machine using an intermediary computer system.

FIG. 2 depicts a flow diagram for transmitting an updated state of a primary virtual machine to a backup virtual machine using intermediary computer system 115. In one embodiment, primary server 105, which hosts primary VM 100, includes a checkpointing module (or other checkpointing functionality) in its hypervisor. As further detailed below, such a checkpointing module transmits checkpoint information packets over high bandwidth connection 120 to intermediary 115 at each checkpoint. Each checkpoint information packet includes information reflecting changes in the state of primary VM's 100 memory (and emulated devices, in certain embodiments) from the previously transmitted checkpoint information packet. In one embodiment, transmission of checkpoint information packets by the hypervisor of primary server 105 occurs, for example, approximately at a rate of 50 to 100 times per second.

In step 200, the hypervisor of primary server 105 instantiates primary VM 100. In step 202, the hypervisor of primary server 105 takes an initial snapshot of the state of primary VM 100 and transmits the snapshot to intermediary 115. The initial snapshot comprises a plurality of memory pages that make up the state of memory (and, in certain embodiments, the state of emulated devices) of primary VM 100. For example, in one embodiment, each memory page has a size of 4 KB such that a primary VM 100 configured with a virtual RAM of 4 GB would have an initial snapshot size of approximately 1 million memory pages. In an embodiment utilizing VMware's ESX™ virtualization platform, VMware's VMotion technology can be used to create and transmit such an initial snapshot. In step 204, intermediary 115 receives and stores the initial snapshot. In step 206, the hypervisor of primary VM 100 initiates a timer to periodically trigger the initiation of checkpoints to generate checkpoint information packets (e.g., 50 to 100 times a second, etc.). Prior to the expiration of the timer, in step 208, the hypervisor delays and queues any and all outbound network packets generated by primary VM 100.

Once the timer expires in step 210, the hypervisor initiates a checkpoint by stunning primary VM 100 (i.e., freezes its execution state) in step 212 and generates a checkpoint information packet reflecting the current state of stunned primary VM 100 and transmits the checkpoint information packet to intermediary 115 in step 214. In one embodiment, the checkpoint information packet comprises a subset of the memory pages (or portions thereof) of the initial snapshot that have been updated during execution of primary VM 100 since a previously transmitted checkpoint information packet (or since the initial snapshot for a first checkpoint information packet). It should be recognized that a variety of techniques may be utilized to identify updated memory pages in primary VM 100 including, for example, leveraging hardware that may be available on primary server 105 for detecting such modified pages through hardware controlled dirty bits of page tables and page directories used for memory virtualization. In step 216, intermediary 115 successfully receives the transmitted checkpoint information packet and in step 218 transmits an acknowledgement of successful receipt back to primary server 105. Once the hypervisor of primary server 105 receives the transmitted acknowledgement in step 220, the hypervisor resumes execution of primary VM 100 in step 222 and releases all the queued up network packets (from step 208) in step 224 before returning back to step 208. Delaying and queuing the outbound network packets in step 208 and releasing them only after receiving acknowledgement from intermediary 115 of receipt of a checkpoint information packet in step 220 ensures that restoration of primary VM 100 by backup server 135 upon a failure of primary VM 100 is based on a state of primary VM 100 that can properly resume network communications with external entities (i.e., re-transmit outbound network packets since the recovered state without confusing recipients, re-receive inbound network packets that it is expecting, etc.).

Meanwhile, in step 226, intermediary 115 updates its stored snapshot of the state of primary VM 100 with the updated memory pages (or portions thereof) in the checkpoint information packet received in step 216. Simultaneously with its continuous receipt of checkpoint information packets and updates to its stored snapshot of the state of primary VM 100 in steps 216 and 226, intermediary 115 also continuously (e.g., via a separate running process or thread, etc.) determines and transmits those received memory pages that have been modified less or least recently by primary VM 100 to backup server 135 in step 228 (such less or least recently modified memory pages referred to herein as "cold" memory pages). In step 230, the hypervisor of backup server 135 receives these cold memory pages and, in step 232, incorporates the cold memory pages into its reconstructed state of primary VM 100 for backup VM 130. It should be recognized that the reconstructed state of primary VM 100 maintained by backup VM 130 may not necessarily reflect a completed state of any particular past "checkpointed" state of primary VM 100 since intermediary 115, in step 228, only transmits "cold" memory pages to backup server 135. That is, memory pages that are considered "hotter" by intermediary 115 (i.e., modified more recently), even if needed to provide backup server 135 a complete set of memory pages reflecting the state of primary VM 100 at a particular checkpoint, are held back and not transmitted to backup server 135. Holding back such hotter memory pages conserves the limited bandwidth capacity of lower bandwidth connection 140 between intermediary 115 and backup server 135, based upon a presumption that the hotter memory pages will be again modified before backup VM 130 needs to take any action due to a failure of primary VM 100.

If, in step 234, intermediary 115 detects a failure of primary VM 100 (or is otherwise notified thereof), then in step 236, intermediary 115 notifies backup server 135 of the failure of primary VM 100 and transmits any unsent memory pages of its stored snapshot of primary VM 100 to backup server 135. In step 238, backup server 135 receives notification of the failure of primary VM 100 and the memory pages and, in step 240, incorporates the received memory pages into its reconstructed state for primary VM 100 and resumes execution of primary VM 100 as backup VM 130.

Figure 3:
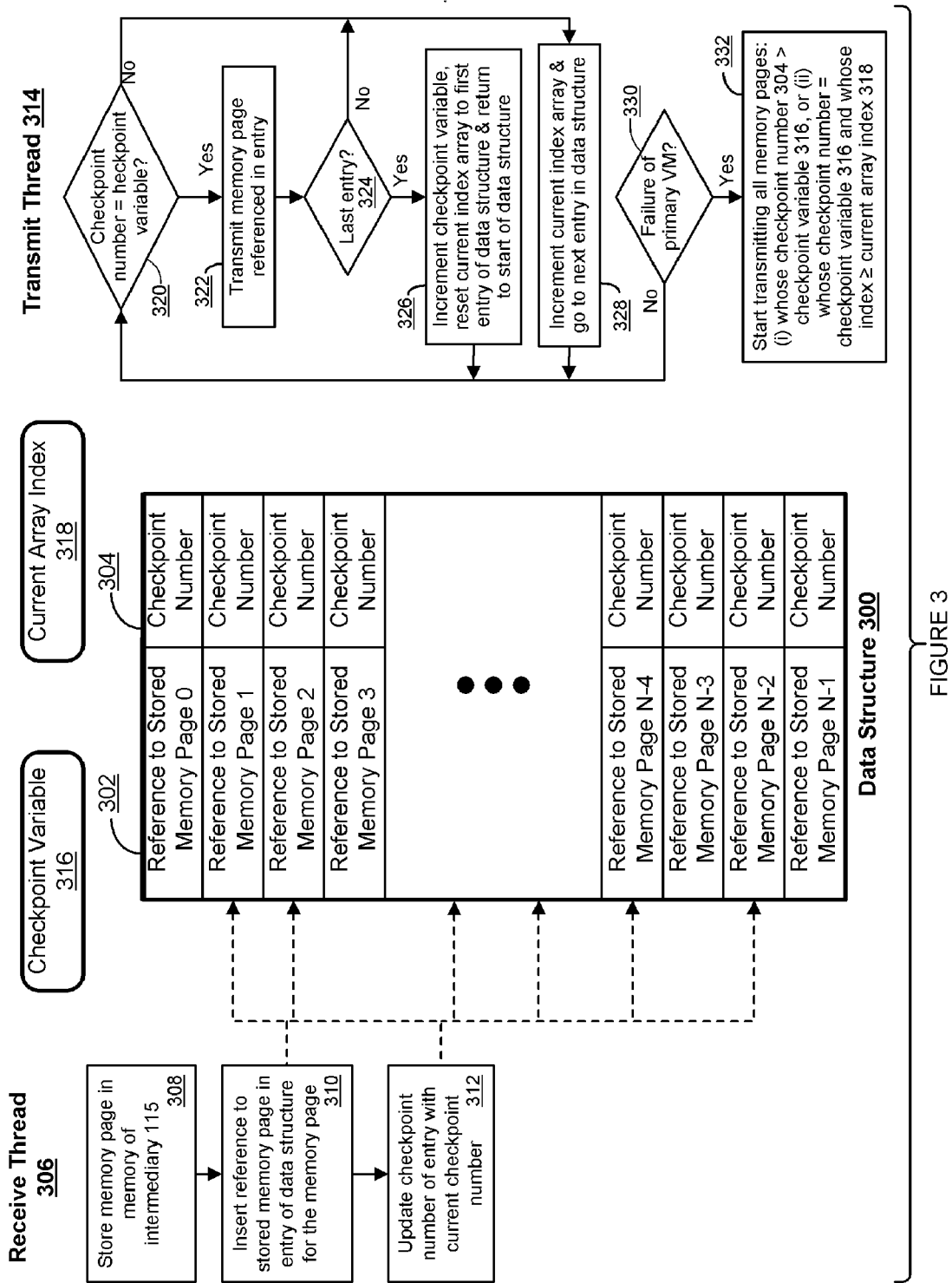
FIG. 3 depicts a data structure for transmitting cold memory pages at an intermediary computer system.

FIG. 3 depicts a data structure for transmitting cold memory pages at intermediary computer system 115. In one embodiment, intermediary 115, in contrast to primary server 105 and backup server 135 which run virtualization platforms, is a non-virtualized computer system running one or more processes (e.g., or threads, etc.) that receives checkpoint information packets from primary server 105 and transmits memory pages to backup server 135 as based upon information maintained in a data structure 300 (although it should be recognized that intermediary 115 may also be implemented in a virtual machine in alternative embodiments). As depicted in FIG. 3, data structure 300 is an array of entries that each correspond to one of memory pages 0 to N−1 that comprise the initial snapshot of primary VM 100 (see, e.g., step 202 of FIG. 2). Each such entry comprises a reference field 302 (e.g., address pointer) to a location in intermediary's 115 memory that stores a copy of the memory page received from primary server 105 and a checkpoint number field 304 indicating the checkpoint (represented as an epoch or chronological number) in which intermediary 115 received its current copy of the memory page.

A thread, referred to as receive thread 306, manages the receipt of memory pages of primary VM 100 from primary server 105 (e.g., from the initial snapshot in step 202 as well as from each subsequent checkpoint information packet in step 214). In step 308, for each memory page received from primary server 105 via high bandwidth connection 120, receive thread 306 stores the memory page in the memory of intermediary 115. In step 310, receive thread 306 inserts the storage address of the stored memory page into the reference field 302 of the entry in data structure 300 corresponding to the received memory page. In step 312, receive thread 306 updates the checkpoint number field 304 of the entry with the current checkpoint number.

A simultaneously running thread, referred to as transmit thread 314, manages the transmission of "cold" memory pages (e.g., least recently modified) to backup server 135 as described in step 228 of FIG. 2 (via low bandwidth connection 140). Transmit thread 314 maintains a checkpoint variable 316 indicating a checkpoint number that transmit thread 314 is currently operating upon as well as a current array index 318 that indicates the current entry in data structure 300 upon which transmission thread 314 is operating during its execution. Checkpoint variable 316 is initialized to zero (e.g., the value of checkpoint number field 304 in each entry of data structure 300 when such entry corresponds to the memory page received from the initial snapshot received in step 204 of FIG. 2) and current array index 318 is initialized to the index of the first entry of data structure 300 (e.g., index of zero). Transmit thread 314 begins with the first entry of data structure 300 (e.g., entry for memory page 0) and if such entry's checkpoint number field 304 matches checkpoint variable 316 in step 320, then in step 322, transmit thread 314 begins transmitting the memory page (i.e., such memory page being a "cold" memory page) referenced in the entry's reference field 302 to backup server 135 through lower bandwidth connection 140. In step 324, upon receiving an acknowledgment from backup server 135 of successful receipt of the memory page, transmit thread 314 determines whether current array index 318 represents the index of the last entry of data structure 300. If transmit thread 314 determines that current array index 318 represents the index of the last entry in data structure 300, then in step 326, transmit thread 314 increments checkpoint variable 316, resets current array index 318 to the index of the first entry of data structure 300 (e.g., index of zero), and returns to the beginning of data structure 300. Otherwise, transmit thread 314 increments current array index 318 and moves to the next entry in data structure 300 in step 328.

If, in step 330, transmit thread 314 receives notification of a failure of primary VM 100, then in step 332, transmit thread 314 traverses through data structure 300, transmitting memory pages referenced in each entry (a) whose checkpoint number 304 is greater than checkpoint variable 316, or (b) whose checkpoint number 304 equals checkpoint variable 316 and whose index is greater than or equal to current array index 318 (i.e., indicating that the memory page has not yet been transmitted to backup server 135). In one embodiment, upon receiving notification of a failure of primary VM 100 in step 330, transmit thread 314 begins to transmit the "hotter" memory pages first, by transmitting those memory pages having the highest values in their checkpoint number fields 304, in an effort to enable backup VM 130 to start execution prior to receiving all unsent memory pages in the snapshot, under a presumption, for example, that the hotter memory pages are more likely to be accessed during subsequent execution of backup VM 130 than colder memory pages.

It should be recognized that transmit thread 314 may traverse data structure 300 and transmit cold memory pages to backup server 135 at a significantly slower rate due to lower bandwidth connection 140 than the rate that receive thread 308 receives and updates memory pages at each checkpoint through high bandwidth connection 120. As such, the value of checkpoint variable 316 remains lower than the actual current checkpoint number of checkpoint information packets received by receive thread 306. By holding back hotter memory pages and transmitting cold memory pages, intermediary 115 thus reduces the possibility that the bandwidth capacity of lower bandwidth connection 140 will be wasted on transmission of memory pages that would likely be overwritten with updated data in the near future (i.e., fewer memory pages are transmitted by intermediary 115 than are received).

It should be recognized that data structure 300 and techniques described in FIG. 3 are merely exemplary and that a variety of alternative data structures and techniques that may be utilized to determine whether memory pages are "cold" (i.e., with a different conception of how "cold" may be defined or assessed). For example, in an alternative embodiment of FIG. 3 may include a transmission bit in each entry of data structure 300 which would indicate whether the memory page corresponding to the entry has already been transmitted to backup VM 130. Another alternative embodiment utilizes an array of entries indexed by memory pages of the primary VM's snapshot (similar to data structure 300), where each entry in the array comprises a reference to the stored memory page (similar to reference field 302) and a counter value. In such an embodiment, a receive thread increments the counter value for an entry each time a received checkpoint information packet includes a corresponding updated memory page. Simultaneously, a transmit thread continually cycles through the array and transmits memory pages corresponding to entries that have a pre-specified low counter value. Such an embodiment utilizes the concept of least frequently modified memory pages to define "cold" rather than least recently modified. Yet another alternative embodiment utilizes a data structure that maintains a list of checkpoint numbers for each memory page corresponding to the checkpoints in which such memory page was updated. Such a data structure provides flexibility to specify or define "cold" memory pages in a variety of ways, such as, for example, memory pages with the smallest list of checkpoint numbers or memory pages that have remained unchanged for a consecutive number of checkpoints (e.g., least frequently modified or least recently modified, etc.).

An exemplary host computing device for implementing embodiments disclosed herein is next described.

Figure 4:
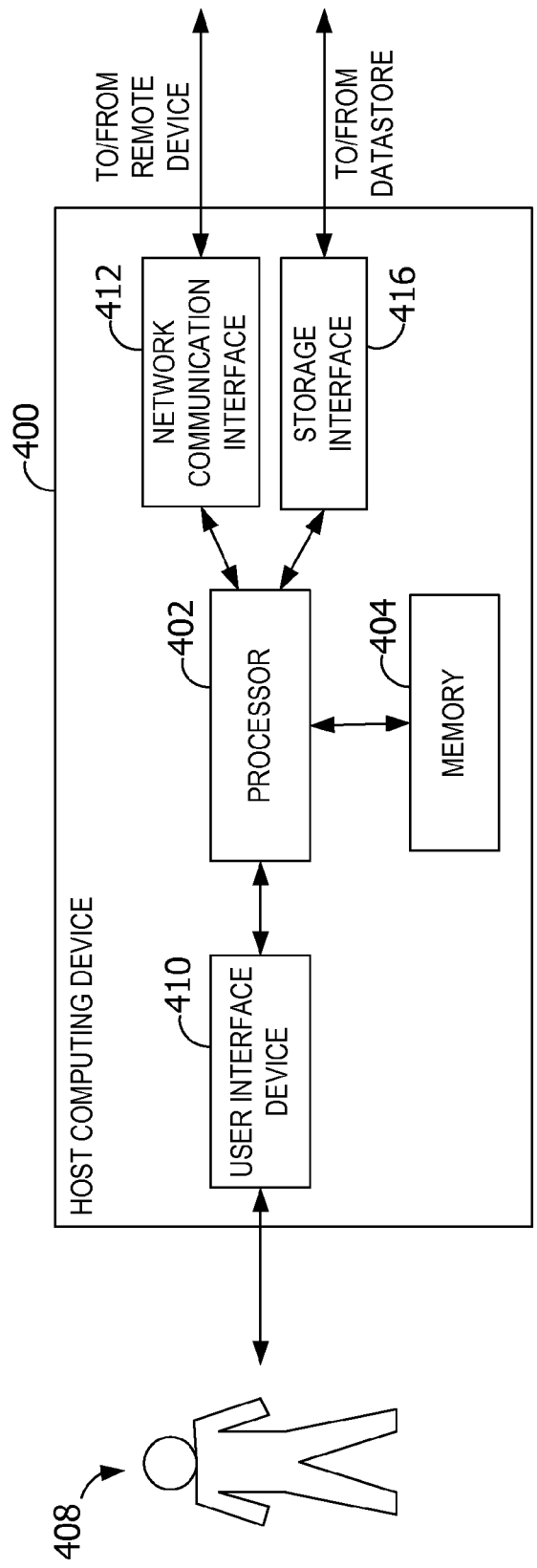
FIG. 4 is a block diagram of an exemplary host computing device.

FIG. 4 is a block diagram of an exemplary host computing device 400. The functionality of each of first computer system 802, intermediary computer system 115, and second computer system 806 may be implemented by a computing device such as host computing device 400.

Host computing device 400 represents any computing device that includes a processor 402 for executing instructions. For example, host computing device 400 may represent a group of processing units or other computing devices such as in a cloud computing configuration. Processor 402 includes any quantity of processing units, and is programmed to execute computer-executable instructions for implementing aspects of the disclosure. The instructions may be performed by processor 402 or by multiple processors executing within host computing device 400, or performed by a processor or by multiple processors external to host computing device 400. In some embodiments, executable instructions are stored in a memory 404. Memory 404 is any device allowing information, such as executable instructions and/or other data, to be stored and retrieved. Memory 404 includes any quantity of computer-readable media associated with or accessible by host computing device 400. Memory 404, or portions thereof, may be internal to host computing device 400, external to host computing device 400, or both. For example, memory 404 may include one or more random access memory (RAM) modules, flash memory modules, hard disks, solid state disks, and/or optical disks.

Host computing device 400 may include a user interface device 410 for receiving data from a user 408 and/or for presenting data to user 408. User 408 may interact indirectly with host computing device 400 via another computing device such as VMware's vCenter Server or other management device. User interface device 410 may include, for example, a keyboard, a pointing device, a mouse, a stylus, a touch sensitive panel (e.g., a touch pad or a touch screen), a gyroscope, an accelerometer, a position detector, and/or an audio input device. In some embodiments, user interface device 410 operates to receive data from user 408, while another device (e.g., a presentation device) operates to present data to user 408. In other embodiments, user interface device 410 has a single component, such as a touch screen, that functions to both output data to user 408 and receive data from user 408. In such embodiments, user interface device 410 operates as a presentation device for presenting information to user 408. In such embodiments, user interface device 410 represents any component capable of conveying information to user 408. For example, user interface device 410 may include, without limitation, a display device (e.g., a liquid crystal display (LCD), organic light emitting diode (OLED) display, or "electronic ink" display) and/or an audio output device (e.g., a speaker or headphones). In some embodiments, user interface device 410 includes an output adapter, such as a video adapter and/or an audio adapter. An output adapter is operatively coupled to processor 402 and configured to be operatively coupled to an output device, such as a display device or an audio output device.

Host computing device 400 also includes a network communication interface 412, which enables host computing device 400 to communicate with a remote device (e.g., another computing device) via a communication medium, such as a wired or wireless packet network. For example, host computing device 400 may transmit and/or receive data via network communication interface 412. User interface device 410 and/or network communication interface 412 may be referred to collectively as an input interface and may be configured to receive information from user 408.

Host computing device 400 further includes a storage interface 416 that enables host computing device 400 to communicate with one or more of datastores 316, which store virtual disk images, software applications, and/or any other data suitable for use with the methods described herein. In exemplary embodiments, storage interface 416 couples host computing device 400 to a storage area network (SAN) (e.g., a Fibre Channel network) and/or to a network-attached storage (NAS) system (e.g., via a packet network). The storage interface 416 may be integrated with network communication interface 412.

Figure 5:
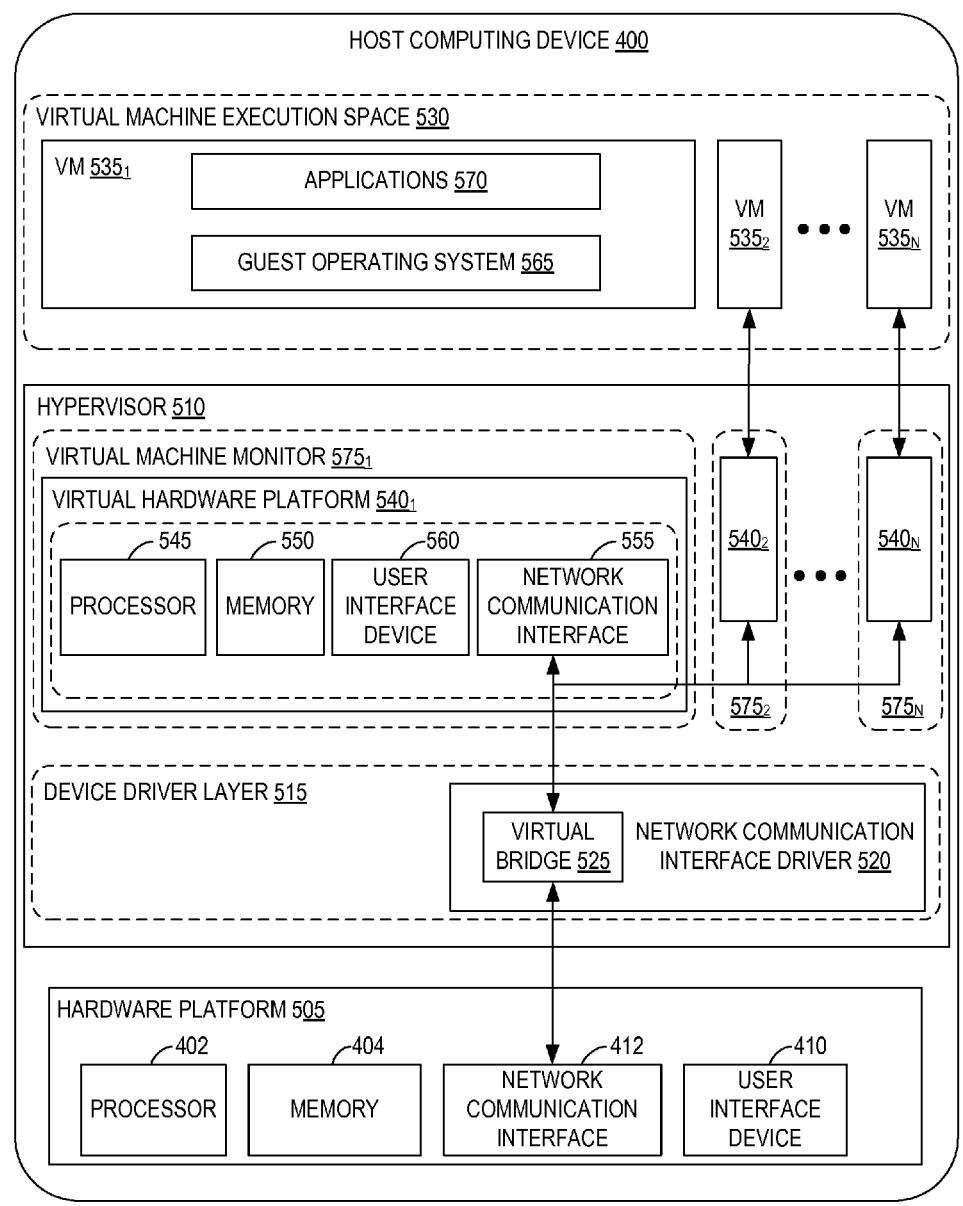
FIG. 5 is a block diagram of virtual machines that are instantiated on a computing device, such as the host computing device shown in FIG. 4.

FIG. 5 depicts a block diagram of virtual machines $535_1$, $535_2 \ldots 535_N$ that are instantiated on host computing device 400, which may be referred to as a host computing device or simply host 314. Host computing device 400 includes a hardware platform 205, such as an x86 architecture platform. Hardware platform 205 may include processor 402, memory 404, network communication interface 412, user interface device 410, and other input/output (I/O) devices, such as a presentation device 106 (shown in FIG. 4). A virtualization software layer, also referred to hereinafter as a hypervisor 510, is installed on top of hardware platform 205.

The virtualization software layer supports a virtual machine execution space 530 within which multiple virtual machines (VMs $535_1$-$535_N$) may be concurrently instantiated and executed. Hypervisor 510 includes a device driver layer 515, and maps physical resources of hardware platform 205 (e.g., processor 402, memory 404, network communication interface 412, and/or user interface device 410) to "virtual" resources of each of VMs $535_1$-$535_N$ such that each of VMs $535_1$-$535_N$ has its own virtual hardware platform (e.g., a corresponding one of virtual hardware platforms $540_1$-$540_N$), each virtual hardware platform having its own emulated hardware (such as a processor 545, a memory 550, a network communication interface 555, a user interface device 560 and other emulated I/O devices in VM $535_1$). Hypervisor 510 may manage (e.g., monitor, initiate, and/or terminate) execution of VMs $535_1$-$535_N$ according to policies associated with hypervisor 510, such as a policy specifying that VMs $535_1$-$535_N$ are to be automatically restarted upon unexpected termination and/or upon initialization of hypervisor 510. In addition, or alternatively, hypervisor 510 may manage execution VMs $535_1$-$535_N$ based on requests received from a device other than host computing device 400. For example, hypervisor 510 may receive an execution instruction specifying the initiation of execution of first VM $535_1$ from a management device via network communication interface 412 and execute the execution instruction to initiate execution of first VM $535_1$.

In some embodiments, memory 550 in first virtual hardware platform $540_1$ includes a virtual disk that is associated with or "mapped to" one or more virtual disk images stored on a disk (e.g., a hard disk or solid state disk) of host computing device 400. The virtual disk image represents a file system (e.g., a hierarchy of directories and files) used by first VM $535_1$ in a single file or in a plurality of files, each of which includes a portion of the file system. In addition, or alternatively, virtual disk images may be stored on one or more remote computing devices, such as in a storage area network (SAN) configuration. In such embodiments, any quantity of virtual disk images may be stored by the remote computing devices.

Device driver layer 515 includes, for example, a communication interface driver 520 that interacts with network communication interface 412 to receive and transmit data from, for example, a local area network (LAN) connected to host computing device 400. Communication interface driver 520 also includes a virtual bridge 525 that simulates the broadcasting of data packets in a physical network received from one communication interface (e.g., network communication interface 412) to other communication interfaces (e.g., the virtual communication interfaces of VMs $535_1$-$535_N$). Each virtual communication interface for each VM $535_1$-$535_N$, such as network communication interface 555 for first VM $535_1$, may be assigned a unique virtual Media Access Control (MAC) address that enables virtual bridge 525 to simulate the forwarding of incoming data packets from network communication interface 412. In an embodiment, network communication interface 412 is an Ethernet adapter that is configured in "promiscuous mode" such that all Ethernet packets that it receives (rather than just Ethernet packets addressed to its own physical MAC address) are passed to virtual bridge 525, which, in turn, is able to further forward the Ethernet packets to VMs $535_1$-$535_N$. This configuration enables an Ethernet packet that has a virtual MAC address as its destination address to properly reach the VM in host computing device 400 with a virtual communication interface that corresponds to such virtual MAC address.

Virtual hardware platform $540_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 565 in order to execute applications 570 for an instantiated VM, such as first VM $535_1$. Virtual hardware platforms $540_1$-$540_N$ may be considered to be part of virtual machine monitors (VMM) $575_1$-$575_N$ that implement virtual system support to coordinate operations between hypervisor 510 and corresponding VMs $535_1$-$535_N$. Those with ordinary skill in the art will recognize that the various terms, layers, and categorizations used to describe the virtualization components in FIG. 5 may be referred to differently without departing from their functionality or the spirit or scope of the disclosure. For example, virtual hardware platforms $540_1$-$540_N$ may also be considered to be separate from VMMs $575_1$-$575_N$, and VMMs $575_1$-$575_N$ may be considered to be separate from hypervisor 510. One example of hypervisor 510 that may be used in an embodiment of the disclosure is included as a component in VMware's ESX brand software, which is commercially available from VMware, Inc.

For the operations illustrated and described with reference to FIG. 6 and FIG. 7, first computer system 802 may correspond to a first server hosting a primary virtual machine and second computer system 806 may correspond to a second server hosting a backup virtual machine. In such an example, the first server may reside in a first fault domain while the second server resides in a second fault domain. Further, second computer system 806 may be networked to intermediary computer system 115 through a bandwidth connection (e.g., a low bandwidth connection) that does not support timely transmission of modified states of first computer system 802 received by intermediary computer system 115 at checkpoints.

Figure 6:
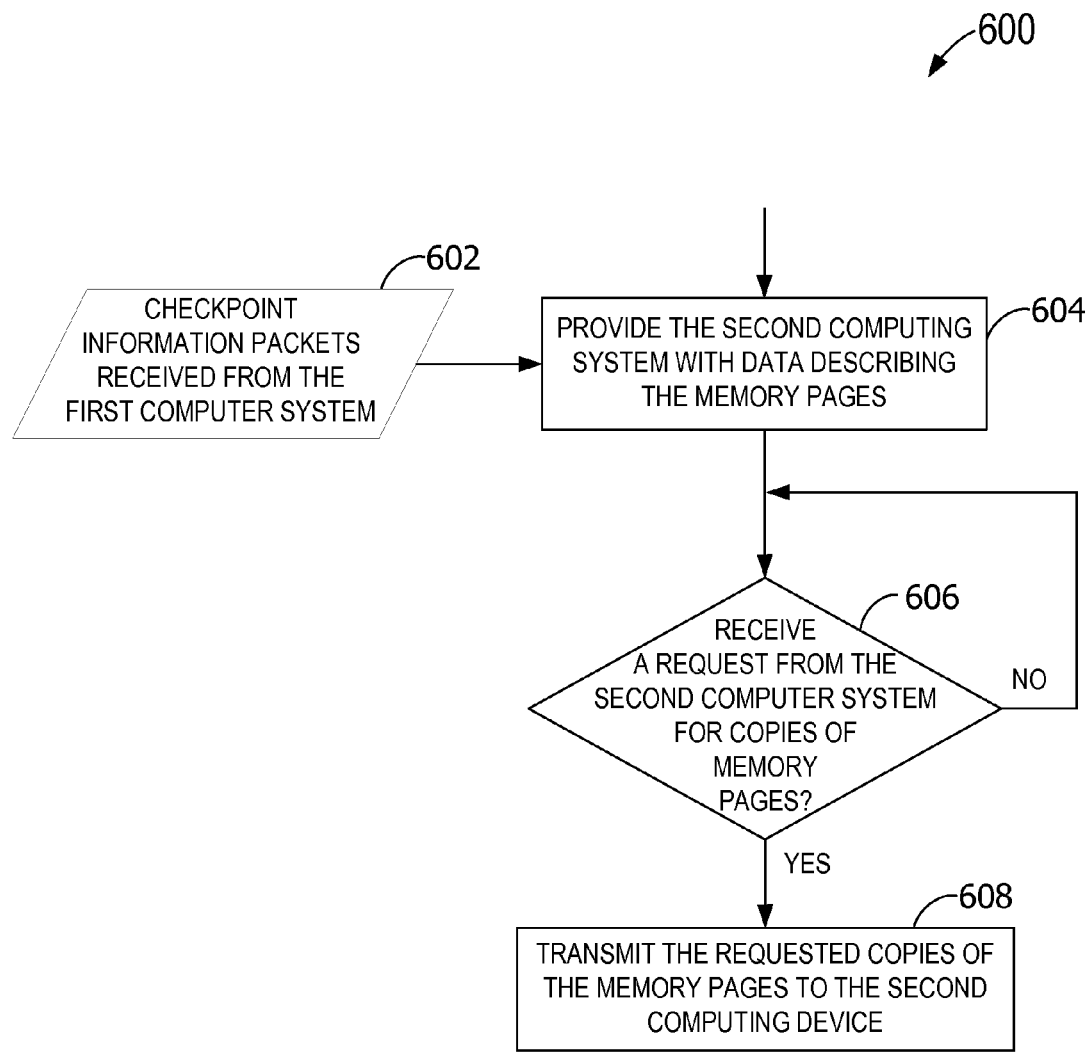
FIG. 6 is a flowchart of an exemplary method performed by an intermediary computer system for transmitting an updated state of a first computer system to a second computer system in response to a request from the second computer system.

FIG. 6 is a flowchart of an exemplary method 600 performed by intermediary computer system 115 to transmit an updated state of first computer system 802 to second computer system 806 in response to a request from second computer system 806. While method 600 is described with reference to execution by intermediary computer system 115, it is contemplated that method 600 may be performed by any computing device. Further, one or more of the operations may be performed by different threads on intermediary computer system 115.

Further, the operations illustrated in FIG. 6 may be implemented as computer-executable instructions stored on one or more computer-readable storage media. The instructions, when executed by a processor of intermediary computer system 115, cause the processor to transmit an updated state of first computer system 802 to second computer system 806. In some embodiments, second computer system 806 is networked to intermediary computer system 115 through a low bandwidth connection that does not support timely transmission of modified states of first computer system 802 received by intermediary computer system 115 at checkpoints.

At 602, intermediary computer system 115 receives checkpoint information packets from first computer system 802. Each checkpoint information packet has updated data corresponding to one or more memory pages of first computer system 802 that have been modified since a previously received checkpoint information packet. In some embodiments, intermediary computer system 115 receives the checkpoint information packets periodically through a high bandwidth connection with first computer system 802.

In some embodiments, intermediary computer system 115 maintains an array of entries corresponding to each memory page received from first computer system 802. Each entry of the array includes a reference to a copy of the corresponding memory page stored in intermediary computer system 115, and a checkpoint number identifying a checkpoint at which the copy was received by intermediary computer system 115.

At 604, intermediary computer system 115 provides second computer system 806 with data describing the memory pages stored at intermediary computer system 115. In some embodiments, intermediary computer system 115 publishes the data for access by second computer system 806. For example, intermediary computer system 115 publishes information about dirty memory pages (e.g., modified or changed memory pages) and the coldness of each memory page. The coldness may be based on how long ago the memory page was modified or how frequently the page is being modified. In general, publishing the data includes, for example, publishing one or more of the following for each of the memory pages: a memory page identifier, a time-based age of the memory page, a frequency of modification for the memory page, and a recency of modification to the memory page. Intermediary computer system 115 may also provide an application programming interface (API) to enable second computer system 806 to request one or more of the memory pages from intermediary computer system 115. For example, the API may include a call in which the memory page identifier is an argument.

Second computer system 806 analyzes or otherwise processes the data to identify memory pages of interest to second computer system 806. Second computer system 806 may then request particular memory pages from intermediary computer system 115. For example, if intermediary computer system 115 receives from second computer system 806 a request for a copy of at least one of the memory pages at 606, intermediary computer system 115 transmits the requested copy of the memory page to the second computing device at 608.

Alternatively or in addition, second computer system 806 may define policy information describing the type or kind of memory pages of interest to second computer system 806. The policy information includes factors or criteria for use in identifying the memory pages of interest. The factors or criteria include, for example, quantities of one or more of the following: memory pages per epoch, dirty pages (e.g., changed pages), guest pages, user pages, supervisor pages, large pages (e.g., more than four kilobytes), and the like. Second computer system 806 provides the policy information to intermediary computer system 115. Intermediary computer system 115 receives and applies the policy information to select, track, and/or monitor memory pages matching the criteria specified in the policy information. Intermediary computer system 115 collects data describing the selected, tracked, and/or monitored memory pages.

Alternatively or in addition to transmitting the updated state of first computer system 802 to second computer system 806 on demand as requested by second computer system 806 as illustrated in FIG. 6, intermediary computer system 115 may automatically transmit the updated state (e.g., without a request from second computer system 806). For example, intermediary computer system 115 may periodically determine whether the one or more memory pages stored at intermediary computer system 115 have been updated by first computer system 802 and have not been transmitted to second computer system 806. If so, intermediary computer system 115 transmits to second computer system 806, without a request from second computer system 806, the updated data corresponding to a memory page determined to be a least recently updated memory page. Determining whether any of the memory pages have been least recently updated includes, for example, traversing entries in an array storing received memory pages to compare a current checkpoint variable with the checkpoint number of each entry of the array. If the checkpoint number of the entry equals the current checkpoint variable, intermediary computer system 115 identifies the memory page corresponding to that entry as a least recently updated memory page. After analyzing a last entry in the array, intermediary computer system 115 increments the current checkpoint variable and immediately or subsequently proceeds to re-traverse the array. In some embodiments, the identified memory pages are then transmitted to second computer system 806. If updated data corresponding to a plurality of unsent memory pages is to be sent to second computer system 806, intermediary computer system 115 sends the memory pages that have been least recently modified first.

Similarly, intermediary computer system 115 may periodically determine whether the one or more memory pages stored at intermediary computer system 115 have been updated by first computer system 802 and have not been transmitted to second computer system 806. If so, intermediary computer system 115 transmits to second computer system 806, without a request from second computer system 806, the updated data corresponding to a memory page determined to be a least frequently updated memory page.

Figure 7:
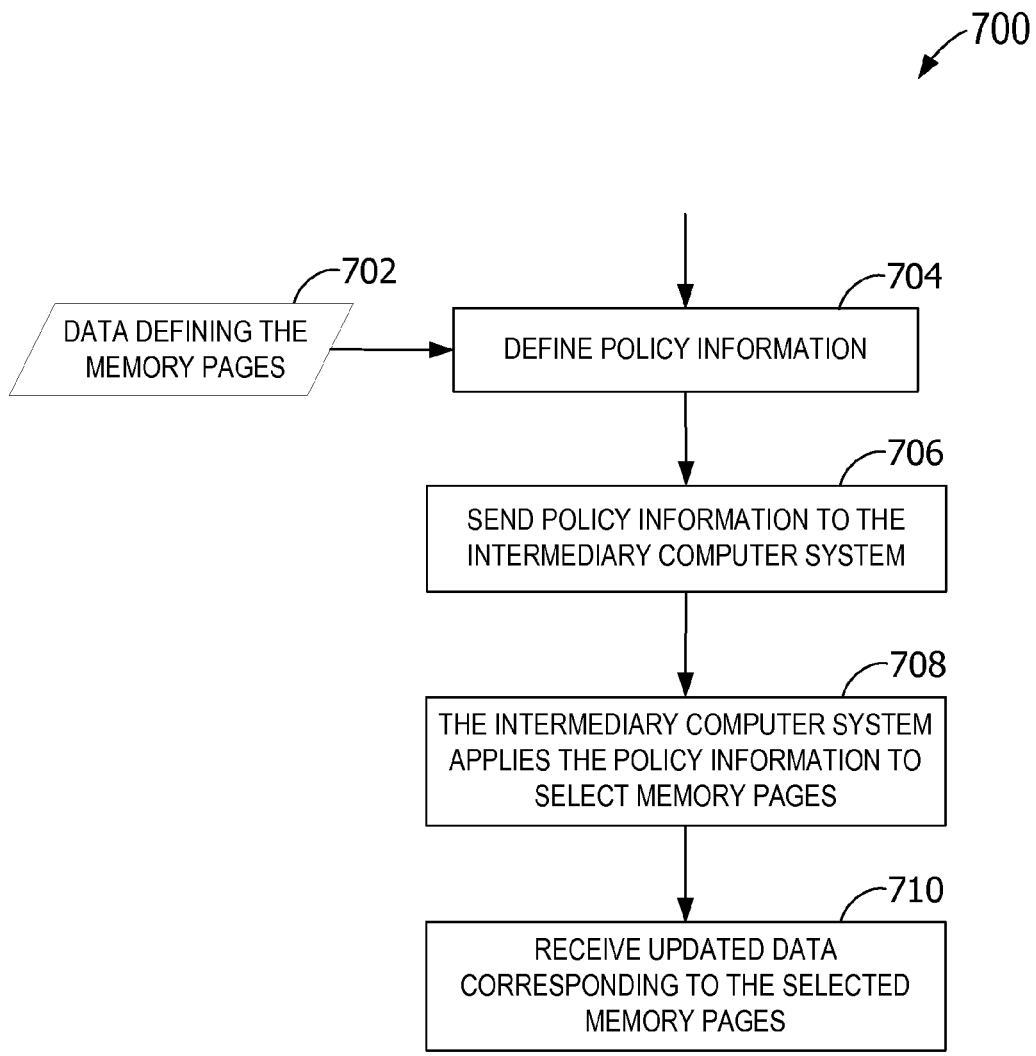
FIG. 7 is a flowchart of an exemplary method performed by a second computer system for policy-based requesting of an updated state of a first computer system from an intermediary computer system.

FIG. 7 is a flowchart of an exemplary method 700 performed by second computer system 806 to request an updated state of first computer system 802 from intermediary computer system 115 based on the policy information. While method 700 is described with reference to execution by second computer system 806, it is contemplated that method 700 may be performed by any computing device. Further, one or more of the operations may be performed by different threads on second computer system 806.

At 702, second computer system 806 receives or otherwise accesses data defining the memory pages available at the intermediary computing device. The data includes, for example, the published data described above with reference to FIG. 6. At 704, second computer system 806 defines policy information. As described herein, the policy information includes factors or criteria for use in identifying the memory pages of interest.

At 706, second computer system 806 sends the defined policy information to intermediary computer system 115. Intermediary computer system 115 applies the policy information to select, track, or monitor particular memory pages. Intermediary computer system 115 sends updated data corresponding to the selected memory pages stored at intermediary computer system 115 to second computer system 806. At 708, second computer system 806 receives the updated data from intermediary computer system 115.

In some embodiments, second computer system 806 may specify in the policy information, or request explicitly, copies of the same memory page corresponding to different times or time intervals. For example, second computer system 806 may request a copy of a particular memory page before application of a root toolkit and a copy of the same particular memory page after application of the root toolkit. Upon receipt of the two (or more) copies of the same particular memory page, second computer system 806 compares the received copies to identify differences in the copies. This enables second computer system 806 to analyze the effects of applying the root toolkit.

Figure 8:
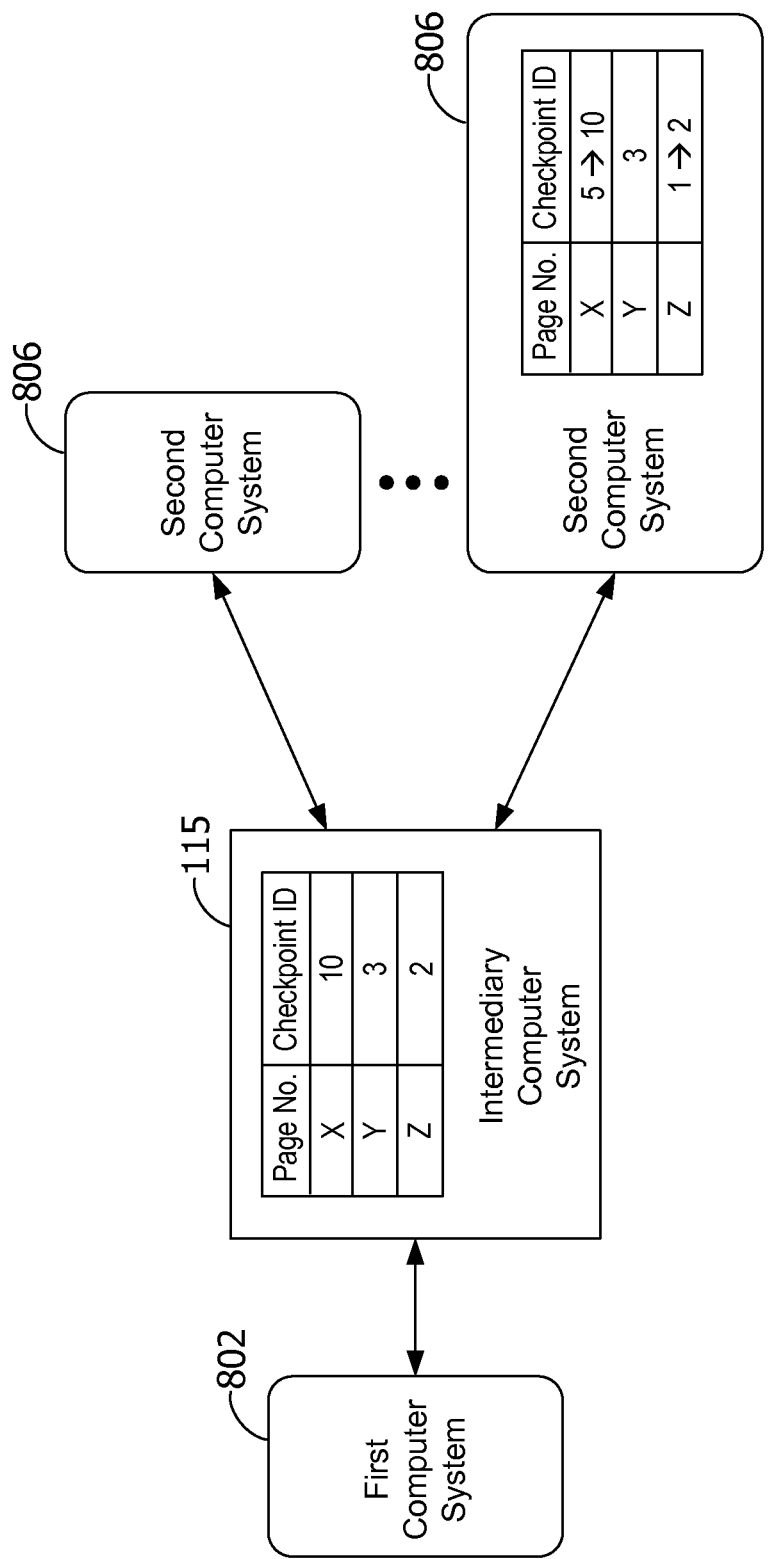
FIG. 8 is a block diagram of an intermediary computer system transmitting pages to a plurality of second computer systems.

FIG. 8 is a block diagram of intermediary computer system 115 transmitting pages to a plurality of second computer systems 806. In some embodiments, intermediary computer system 115 receives pages from first computer system 802 and transmits the pages to a plurality of second computer systems 806 over time, as described herein. Intermediary computer system 115 is independent of each of the different types of second computer systems 806 (e.g., heterogeneous), in some embodiments.

Intermediary computer system 115 maintains information describing the pages stored by intermediary computer system 115. Similarly, each of second computer systems 806 maintains information describing the pages stored by that second computer system 806. The information may be stored in any format and in any data structure. In the example of FIG. 8, the information is stored in tables. An exemplary table correlates each page number to a checkpoint identifier (ID), version number, epoch number, transfer time, or other means for identifying the version of the page represented by the page number.

The table maintained by intermediary computer system 115 correlates page numbers associated with a plurality of the pages stored by intermediary computer system 115 with checkpoint IDs. In some embodiments, intermediary computer system 115 updates the table as the pages are received from first computer system 802 and stored by intermediary computer system 115.

The tables maintained by second computer systems 806 correlate page numbers associated with a plurality of the pages stored by second computer systems 806 with checkpoint IDs. In some embodiments, each table is initially empty, and then populated over time by second computer system 806 maintaining the table as pages are received from intermediary computer system 115. For example, second computer system 806 may request pages from intermediary computer system 115 on a page-by-page basis and thus update the table on a page-by-page basis.

Alternatively or in addition, second computer system 806 may receive a snapshot of the table stored by intermediary computer system 115. From the table, second computer system 806 selects one or more pages to request from intermediary computer system 115 based on the recency of modification of the pages, frequency of modification of the pages, and/or other policy. Second computer system 806 requests the selected pages from intermediary computer system 115.

Intermediary computer system 115 transmits the requested pages to intermediary computer system 115 individually or as a batch of pages. For example, depending on a cost of the link between intermediary computer system 115 and second computer system 806, transmission of the pages from intermediary computer system 115 to second computer system 806 can be throttled. The cost of the link may be defined as available bandwidth, financially, in terms of latency, or any other measure.

As an example and as shown in FIG. 8, the table or map obtained by second computer system 806 indicates that Page X is at Checkpoint ID 5. Second computer system 806 requests Page X from intermediary computer system 115, but receives Page X with Checkpoint ID 10 from intermediary computer system 115 because Checkpoint ID 10 is the latest version of Page X. For example, the table or map maintained by second computer system 806 became out-of-date because of a delay between the snapshot request and the request for Page X. Second computer system 806 stores the received Page X and updates the table to reflect that the stored version or generation of Page X is Checkpoint ID 10. Page X stored by second computer system 806 is thus a coherent copy of Page X stored by intermediary computer system 115 with respect to page number and checkpoint ID.

Similarly, the table or map obtained by second computer system 806 indicates that Page Z is at Checkpoint ID 1. Second computer system 806 requests Page Z from intermediary computer system 115, but receives Page Z with Checkpoint ID 2 from intermediary computer system 115 because Checkpoint ID 2 is the latest version of Page Z. Second computer system 806 stores the received Page Z and updates the table to reflect that the stored version of Page Z is Checkpoint ID 2.

After receiving the initial snapshot of the table maintained by intermediary computer system 115 and receiving the selected pages and updating the table, second computer system 806 may subsequently request another snapshot of the table stored by intermediary computer system 115. Second computer system 806 compares this later snapshot with the table currently maintained by second computer system 806 to identify those pages that have changed (e.g., with different checkpoint IDs). Second computer system 806 then requests updated versions of those changed pages from intermediary computer system 115. In this manner, second computer system 806 only updates those pages that have changed (e.g., dirty pages) since the last iteration.

The table maintained by intermediary computer system 115 may include other columns not shown or described herein, but only transmit selected columns based on the request from second computer system 806. As such, intermediary computer system 115 may dynamically create maps, tables, or snapshots on the fly.

Alternatively or in addition, intermediary computer system 115 may provide additional information from its table that has not been requested by second computer system 806. For example, intermediary computer system 115 may proactively send to second computer system 806 copies of pages that have been recently requested by other second computer systems 806. In this manner, intermediary computer system 115 optimizes page transmission based on the likelihood of relevancy of the pages to second computer system 806. Page transmission may also be optimized based on the cost of the link between intermediary computer system 115 and second computer system 806 (e.g., transmit additional pages if the added cost is minimal or reasonable).

Additional Examples

The following scenarios are merely exemplary and not intended to be limiting in any way.

In one scenario, first computer system 802 fails at some point in time. Upon detection of the failure by intermediary computer system 115 or notification to intermediary computer system 115, intermediary computer system 115 transmits to second computer system 806 the updated data corresponding to each unsent memory page stored at intermediary computer system 115. In this manner, second computer system 806 is then able to move from acting as a backup or secondary system to acting as first computer system 802. For example, upon failure of first computer system 802, intermediary computer system 115 sends an evacuate signal to second computer system 806. Second computer system 806 requests copies of each of the memory pages stored by intermediary computer system 115 that have not yet been transmitted to second computer system 806. Upon the receipt of such a request, intermediary computer system 115 transmits the requested copies of the memory pages to second computer system 806.

In another example, intermediary computer system 115 responds to requests from a plurality of second computer systems 806. In such an example, intermediary computer system 115 may identify request patterns among the plurality of second computer systems 806. Exemplary request patterns include, but are not limited to, page-based patterns (e.g., second computer systems 806 requesting similar sets of memory pages) and time-based patterns (e.g., second computer systems 806 requesting similar sets of memory pages at approximately the same time). Based on the request patterns, intermediary computer system 115 proactively shares copies of memory pages requested by one of second computer systems 806 with other second computer systems 806 (e.g., in anticipation of receiving similar requests from these other second computer systems 806).

Exemplary Operating Environment

It should be recognized that various modifications and changes may be made to the specific embodiments described herein without departing from the broader spirit and scope of the invention as set forth in the appended claims. For example, while the foregoing discussions have focused on embodiments in which primary server 105 and intermediary 115 transmitting complete memory pages (if such memory page has been modified), it should be recognized that alternative embodiments may apply difference techniques or other compression techniques on memory pages at either or both of primary server 105 and intermediary 115 prior to their transmission. Such alternative embodiments may thus transmit only updated data corresponding to the memory pages rather than the complete memory pages themselves. Similarly, it should be recognized that although the foregoing embodiments have discussed a single intermediary 115, embodiments may incorporate multiple intermediaries, possible in different fault domains, such that probability of failure of all intermediaries is negligible. Additionally, while the foregoing embodiments have been generally described using primary and backup VMs, other primary and backup computer systems, including non-virtualized systems, may be used consistent with the teachings herein.

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

One or more embodiments of the present disclosure may be implemented as one or more computer programs, computer-executable instructions, or as one or more computer program modules embodied in one or more computer-readable media. In some embodiments, the term computer-readable medium refers to any data storage device that stores data that can thereafter be input to a computer system. Computer-readable media may be based on any existing or subsequently developed technology for embodying computer programs in a manner that enables them to be read by a computer. Exemplary computer readable media include memory such as hard drives, network attached storage (NAS), read-only memory, random-access memory, flash memory drives, digital versatile discs (DVDs), compact discs (CDs), floppy disks, magnetic tape, and other optical and non-optical data storage devices. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, exclude propagated data signals, and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

The computer readable medium can also be distributed over a network coupled computer system so that the computer readable code is stored and executed in a distributed fashion.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing.

Although described in connection with an exemplary computing system environment, embodiments of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Plural instances may be provided for components, operations or structures described herein as a single instance. Further, at least a portion of the functionality of the various elements illustrated in the figures may be performed by other elements in the figures, or an entity (e.g., processor, web service, server, application program, computing device, etc.) not shown in the figures. For example, while boundaries between various components, operations and data stores are illustrated in the context of specific illustrative configurations, other allocations of functionality are envisioned that fall within the scope of the invention. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

I claim:

1. A non-transitory computer-readable storage medium including instructions that, when executed, cause at least one processor of an intermediary computer system to transmit an updated state of a first computer system to a second computer system, the second computer system being networked to the intermediary computer system through a low bandwidth connection that does not support timely transmission of modified states of the first computer system received by the intermediary computer system at checkpoints, by:
    receiving, at the intermediary computer system, checkpoint information packets from the first computer system, each checkpoint information packet comprising updated data corresponding to one or more memory pages of the first computer system that have been modified since a previously received checkpoint information packet;
    providing the second computer system with data describing the memory pages;
    receiving, from the second computer system based on said providing, a request for a copy of at least one of the memory pages; and
    transmitting the requested copy of the at least one of the memory pages to the second computing system,
    wherein the first computer system is a first server hosting a primary virtual machine and the second computer system is a second server hosting a backup virtual machine.

2. The non-transitory computer-readable storage medium of claim 1, the at least one processor of the intermediary computer system further:
    determining whether the one or more memory pages stored at the intermediary computer system have been least recently updated by the first computer system and have not been transmitted to the second computer system; and
    transmitting the updated data corresponding to a memory page determined to be a least recently updated memory page to the second computer system.

3. The non-transitory computer-readable storage medium of claim 1, the at least one processor of the intermediary computer system further:
    determining whether the one or more memory pages stored at the intermediary computer system have been least frequently updated by the first computer system and have not been transmitted to the second computer system; and
    transmitting the updated data corresponding to a memory page determined to be a least frequently updated memory page to the second computer system.

4. The non-transitory computer-readable storage medium of claim 1, the first server being in a first fault domain and the second server being in a second fault domain.

5. A method for transmitting an updated state of a first computer system to a second computer system through an intermediary computer system, the method comprising:
    receiving, at the intermediary computer system in a first fault domain, checkpoint information packets from the first computer system, each checkpoint information packet comprising updated data corresponding to one or more memory pages of the first computer system that have been modified since a previously received checkpoint information packet;
    providing the second computer system with data describing the memory pages, the second computer system residing in a second fault domain;
    receiving, from the second computer system based on said providing, a request for a copy of at least one of the memory pages; and
    transmitting the requested copy of the at least one of the memory pages to the second computing system,
    wherein the first computer system is a first server hosting a primary virtual machine and the second computer system is a second server hosting a backup virtual machine.

6. The method of claim 5, the second computer system being networked to the intermediary computer system through a bandwidth connection that does not support timely transmission of modified states of the first computer system received by the intermediary computer system at checkpoints.

7. The method of claim 6, the bandwidth connection being a low bandwidth connection.

8. The method of claim 5, wherein receiving the checkpoint information packets comprises receiving the checkpoint information packets through a high bandwidth connection with the first computer system.

9. The method of claim 5, wherein providing the second computer system with the data comprises publishing one or more of the following for each of the memory pages: a memory page identifier, a time-based age of the memory page, a frequency of modification for the memory page, and a recency of modification to the memory page.

10. The method of claim 5, further comprising providing, by the intermediary computer system, an application programming interface for requesting one or more of the memory pages.

11. The method of claim 5, further comprising:
    receiving policy information from the second computer system; and
    collecting, based on the received policy information, the data describing the memory pages.

12. The method of claim 5, upon failure of the first computer system, further comprising transmitting to the second computer system the updated data corresponding to each unsent memory page stored at the intermediary computer system.

13. The method of claim 5, wherein receiving the request comprises receiving a plurality of requests from a plurality of second computer systems.

14. The method of claim 13, further comprising identifying request patterns among the plurality of second computer systems.

15. The method of claim 14, further comprising sharing a copy of the at least one of the memory pages requested by a first one of the plurality of second computer systems with a second one of the plurality of second computer systems based on the identified request patterns.

16. A computer system for transmitting an updated state of a first computing system to a second computing system, the computer system comprising:
    an intermediary computing system residing in a first fault domain, the intermediary computing system receiving checkpoint information packets from the first computing system, each checkpoint information packet comprising updated data corresponding to one or more memory pages of the first computing system that have been modified since a previously received checkpoint information packet; and
    a second computing system residing in a second fault domain and connected to the intermediary computing system, the second computing system defining policy information describing one or more of the memory pages to select, the intermediary computing system further transmitting to the second computing system the one or more of the memory pages selected based on the defined policy information,
    wherein the first computer system is a first server hosting a primary virtual machine and the second computer system is a second server hosting a backup virtual machine.

17. The computer system of claim 16, the intermediary computing system further:
    applying the defined policy information to select the at least one of the memory pages, and tracking the updated data corresponding to only the selected at least one of the memory pages.

18. The computer system of claim 16, the second computing system further sending the defined policy information to the intermediary computing system.

19. The computer system of claim 16, the second computing system being networked to the intermediary computer system through a low bandwidth connection that does not support timely transmission of modified states of the first computer system received by the intermediary computer system at checkpoints.

20. The computer system of claim 16, the second computing system further:
 receiving copies of the same memory page corresponding to different times; and
 comparing the received copies to identify differences therebetween.

\* \* \* \* \*